March 2, 1926.

A. AMSLER

TESTING MACHINE

Filed June 17, 1924  2 Sheets-Sheet 1

1,575,519

Inventor:
Alfred Amsler,
By Henry Orth Jr
Atty.

March 2, 1926.  
A. AMSLER  
TESTING MACHINE  
Filed June 17, 1924  
1,575,519  
2 Sheets-Sheet 2
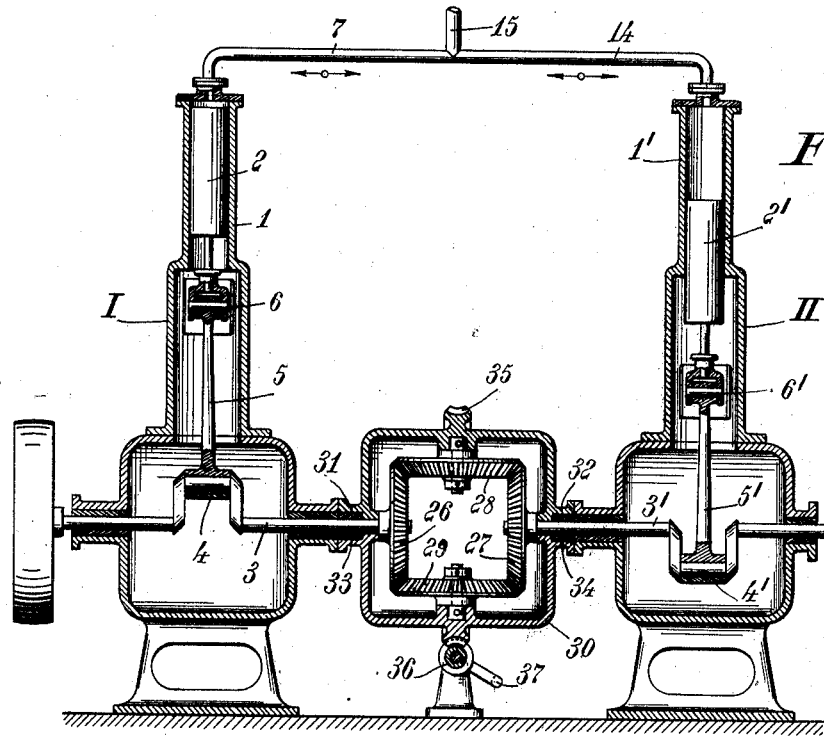
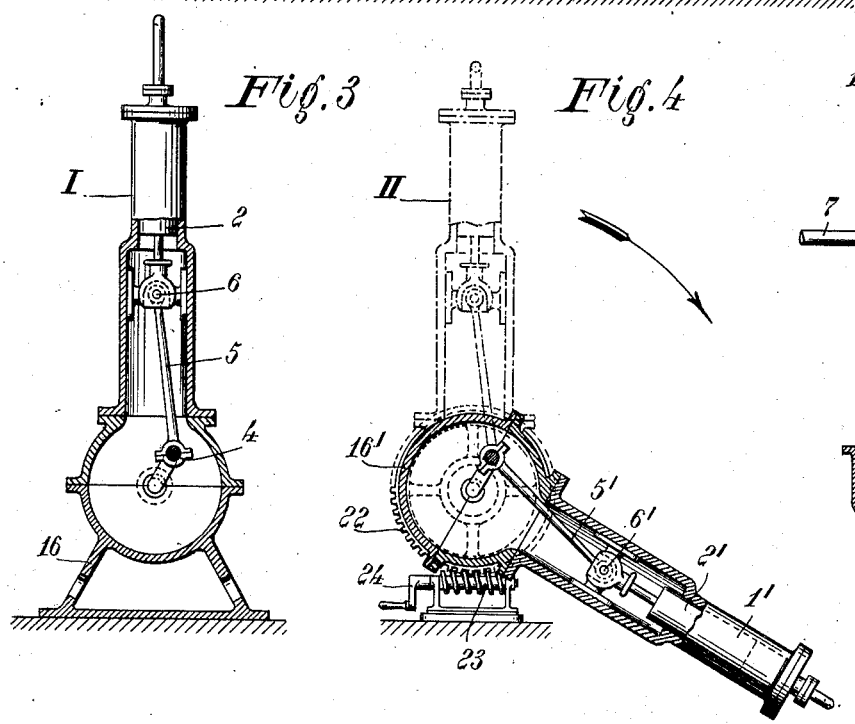
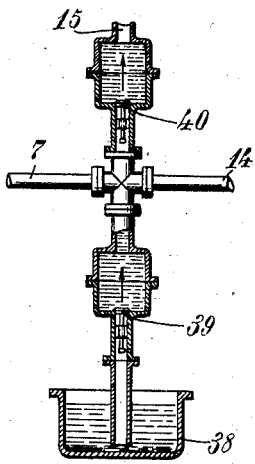
Inventor:
Alfred Amsler,
By Henry Orth Jr.
Atty.

Patented Mar. 2, 1926.

1,575,519

UNITED STATES PATENT OFFICE.

ALFRED AMSLER, OF SCHAFFHAUSEN, SWITZERLAND.

TESTING MACHINE.

Application filed June 17, 1924. Serial No. 720,661.

*To all whom it may concern:*

Be it known that I, ALFRED AMSLER, a citizen of the Republic of Switzerland, residing at Schaffhausen, Switzerland, have invented certain new and useful Improvements in Testing Machines, of which the following is a specification, reference being had therein to the accompanying drawing.

The subject matter of the present invention is a device which may be utilized in combination with any testing machines operated by pressure liquid, such as machines for testing tensile strength, compression strength and bending strength, in order to carry out fatigue tests with changing loads.

The device according to the present invention comprises at least one cylinder filled with liquid, in which a piston is adapted to reciprocate. the cylinder being in an unrestricted communication with the pressure cylinder of the testing machine, so that with the forward stroke of the piston an increase of the pressure in the pressure cylinder is caused and with the backward stroke of the piston a decrease of said pressure is obtained. These load impulses do not occur in the form of shocks but according to the sinus law; the velocity with which the impulses follow each other depends on the speed with which the device runs, which device shall be called hereinafter pulsator.

The magnitude of the fluctuations in the pressure depends on the quantity of the liquid driven to and fro, further on the elastic deformations of the testing machine and of the pulsator and on the elastic and permanent deformations of the test piece treated in the testing machine. The upper limit of the pressure is preferably maintained by a blow-off valve which is so loaded that it is lifted when a certain maximum pressure in the pressure cylinder of the testing machine is reached. The lower limit of the pressure is obtained when the piston of the pulsator has completed its backward stroke. This minimum pressure would remain constant if no pressure liquid were lost and if the test piece would not endure permanent deformations. To compensate these two influences an auxiliary pump is preferably provided which continuously supplies to the pressure cylinder a quantity of pressure liquid which is somewhat in excess of the quantity lost during the operation and the quantity required by the forward movement of the pressure piston of the testing machine when the test piece undergoes permanent deformations. The excess in pressure liquid is then forced through the blow-off valve during each play of the pulsator.

In order to adjust the lower limit of the pressure at will it is necessary to alter the quantity of the pressure liquid oscillated by the pulsator piston. This is preferably obtained according to another object of the invention by providing two pulsators, i. e. two cylinders, in which pistons are reciprocated by means of crank mechanisms, whereby both cylinders are in an unrestricted connection with each other and with the pressure cylinder of the testing machine, and by providing means adapted to produce a phase-displacement between the movements of the two pistons during the operation, so that the total action of the two pulsators may be varied between the sum of the individual actions and the difference of the individual actions. When the two crank shafts are positively connected to each other the phase-displacement may be obtained by turning one of the pulsator cylinders relatively to the other about the axis of the crank shaft, or an adjustable differential gear, for instance an epicyclic gear, may be interposed between the two crank shafts. By this means a device is obtained which serves to produce fluctuations in the pressure the lower and the upper limits of which remain constant throughout the test, irrespective whether during a test a permanent deformation of the test piece occurs or not. The device may therefore be used for carrying out fatigue tests until a rupture or destruction of the test piece takes place. The limits within which the test load varies in a test can be fixed and altered.

Embodiments of the invention are illustrated by way of example on the accompanying drawings, in which:

Figs. 2–4 show in a diagrammatic manner two pulsators connected to each other, with which the phase-displacement of the movements of the two pistons is effected by inclining one of the pulsator cylinders relatively to the other;

Fig. 5 is a detail modification of the means for effecting a phase-displacement between two pulsators, and Fig. 6 shows a detail modification.

Figure 1:
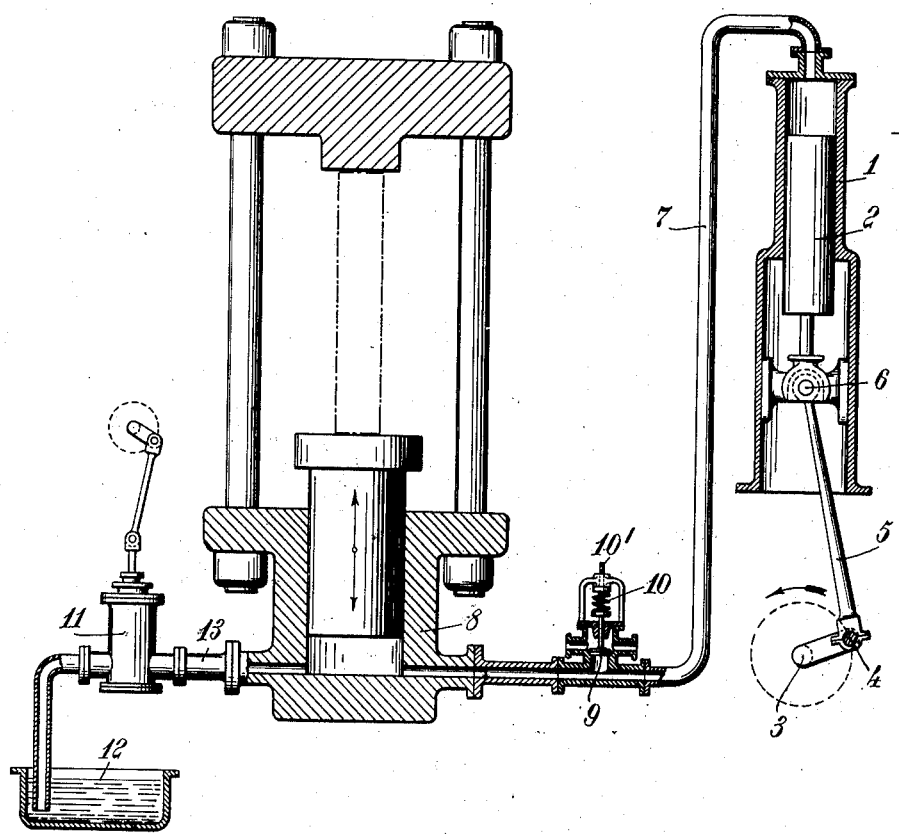
Fig. 1 shows in a vertical section a pulsator connected to a testing machine operated by pressure liquid, the blow-off valve and the auxiliary pump being also indicated.

Referring now to Fig. 1 the pulsator is provided with a cylinder 1 in which a plunger 2 is reciprocated; 3 denotes the axis of the crank shaft, 4 is the crank pin, 5 the connecting rod and 6 is the pin of the cross head of the crank mechanism. By means of the pipe 7 the cylinder 1 of the pulsator is in unrestricted connection with the pressure cylinder 8 of the testing machine. A blow-off valve 9 is inserted in the pipe 7 and the pressure at which the valve is lifted may be adjusted by altering the compression of the spring 10 by means of the screw 10'. 11 designates the auxiliary pump which continuously draws liquid from the receptacle 12 and forces it through the pipe 13 into the cylinder 8 of the testing machine.

When the piston of the pulsator performs its forward stroke a pressure rise is caused in the cylinder of the testing machine and during the backward stroke of the pulsator piston a decrease of the pressure in the cylinder 8 is effected. The upper limit of the pressure is determined by a suitable adjustment of the compression of the spring 10 and the lower limit is determined by the stroke-volume of the pulsator. The pressure liquid forced by the auxiliary pump into the cylinder 8 of the testing machine replaces the leakage losses and supplies the additional quantity required when the test piece undergoes permanent deformations and the piston of the testing machine moves therefore forwardly, the pressure limits do therefore not change during a test.

Figure 2:
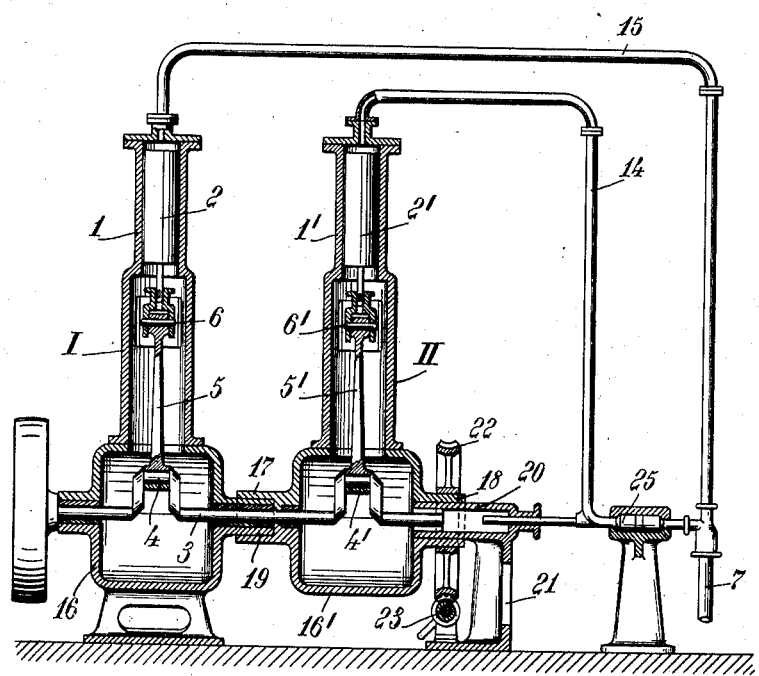

In Figs. 2-4 two pulsators I and II are illustrated which are driven by a crank shaft 3 common to both. 1 and 1' respectively denote the cylinders, 2 and 2' are the plungers, 4 and 4' are the crank pins, 5 and 5' are the connecting rods, and 6 and 6' designate the pins of the cross heads of the pulsators I and II respectively. The pulsator I is connected by means of the pipe 15 to the pipe 7 and the pulsator II is connected by the pipe 14 to the pipe 7 which leads to the pressure cylinder of the testing machine in the manner as is shown in Fig. 1. The pulsators I and II are thus unrestrictedly connected to each other and to the pressure cylinder of the testing machine. The frame 16 of the pulsator I is stationary and the frame 16' together with the cylinder 1' of the pulsator 2 is adapted to be turned about the axis of the crank shaft 3. To this end the frame 16' is provided with laterally projecting sockets 17 and 18 turnably mounted on a sleeve 19 of the frame 16 and on a sleeve 20 of the standard 21 respectively. To the socket 18 a worm-wheel 22 is fixed cooperating with a worm 23 which can be turned by the handle 24. In Fig. 3 the stationary pulsator I is shown partly in a vertical section transverse to the axis of the crank shaft 3, whilst Fig. 4 shows in chain-dotted lines the turnable pulsator II in its vertical position and in full lines the pulsator in an inclined position obtained by turning the handle 24. The gasket joint 25 of the pipe 14 permits this turning. When the cylinders of the two pulsators I and II are in the position illustrated in Fig. 2, in which position both pulsator pistons reach their corresponding extreme positions simultaneously, the two pulsators work alike and their total output is equal to the sum of the individual outputs. When the cylinder of the pulsator II is inclined by a turning movement about the axis of the crank-shaft, the two plungers reach their extreme positions at different moments and the quantity of liquid expelled simultaneously by both pulsators is reduced. In case pulsator II were inclined at an angle of 180° against the stationary pulsator there would be no discharge of liquid into the cylinder of the testing machine if the stroke volume of both pulsators be the same. In this manner the total output of the two pulsators may be varied within the range given by the sum of the individual outputs and their difference, whereby the lower pressure limit may be varied and this variation may be performed during the operation of the pulsators.

The phase-displacement between the movements of the plungers of the two pulsators may also be attained by angularly displacing the two cranks relatively to each other during the operation. Two pulsators, with which the phase-displacement is effected in this manner, are illustrated in Fig. 5.

Between the crank-shafts 3 and 3' of pulsators I and II respectively an epicyclic gear is interposed, which consists of a bevel gear wheel 26 fixed to the crank shaft 3 and a bevel gear wheel 27 fixed to the crankshaft 3' and the planetary bevel gear wheels 28 and 29 meshing with the bevel gear wheels 26 and 27. The latter are rotatably mounted in the casing 30 which is provided with laterally projecting sockets 31 and 32 turnable upon sleeves 33 and 34 around the common axis of the crank shafts 3 and 3'. The casing is provided with a worm wheel rim 35 cooperating with a worm 36 operated by the handle 37. A turning of the latter causes a turning of the casing about the axis of the crank shafts 3 and 3' whereby a phase-displacement between the two crank shafts 3 and 3' and therefore between the movements of the plungers 2 and 2' is obtained with the same action as mentioned above with the embodiment as per Figs. 2-4.

With the arrangement of the pulsators I and II shown in Fig. 5 the space consisting of two cylinders 1 and 1' and the pipe 7 may be connected on the one hand to a liquid receptacle 38 through the interposition of a suction valve 39 and on the other hand to the discharge conduit 7 a pressure valve 40 is inserted in the latter connection. These connections are shown in Fig. 6. Both pulsators form thus a single acting ram pump the discharge of which may be varied by effecting a phase-displacement between the movements of the pulsator plungers, which action is of importance with hydraulic power transmission means.

Instead of providing an auxiliary pressure pump the pressure pump for the testing machine might also be used for replacing the quantity of liquid lost by leakage and required when the test piece undergoes permanent deformations.

I claim:

1. A device for testing machines operated by pressure liquid for carrying out fatigue tests with changing loads, comprising at least one cylinder filled with liquid, an open connection between said cylinder and the pressure cylinder of the testing machine, a piston reciprocable in said cylinder for generating pressure fluctuations in the cylinder of the testing machine, and means to adjust and automatically maintain the maximum and minimum pressure of such pressure fluctuations irrespective of the elastic and permanent deformations of the test piece.

2. A device for testing machines operated by pressure liquid for carrying out fatigue tests with changing loads, comprising at least one cylinder filled with liquid, an open connection between said cylinder and the pressure cylinder of the testing machine, a piston reciprocable in said cylinder for generating sinusoidal pressure fluctuations in the cylinder of the testing machine, and means to adjust and automatically maintain the maximum and minimum pressure of said pressure fluctuations, irrespective of the elastic and permanent deformations of the test piece, said means including the blow-off valve for controlling the maximum pressure in the system.

3. A device for testing machines operated by pressure liquid for carrying out fatigue tests with changing loads, comprising at least one cylinder filled with liquid, an open connection between said cylinder and the pressure cylinder of the testing machine, a piston reciprocable in said cylinder for generating pressure fluctuations in the cylinder of the testing machine, and means to automatically maintain the maximum and minimum pressure of such pressure fluctuations, irrespective of the elastic and permanent deformations of the test piece, said means including a blow-off valve for controlling the maximum pressure in the system, and an auxiliary pump for continuously forcing a quanity of pressure liquid into the pressure cylinder for replacing the liquid lost by leakage and required in the pressure cylinder for compensating permanent deformations of the test piece.

4. A device for carrying out fatigue tests with changing loads, comprising a testing machine operated by pressure liquid and having a pressure cylinder, two cylinders filled with liquid, an open connection between said cylinders and the pressure cylinder of the testing machine, pistons reciprocable in said cylinders for generating pressure fluctuations in the cylinder of the testing machine, a crank gear for operating said pistons, a blow-off valve for determining the upper limit of said pressure fluctuations, one of said cylinders being stationary and the other adapted to swivel about the axis of said crank gear, and means to effect an angular displacement of the movable cylinder relatively to the stationary cylinder for effecting a phase-displacement between the two pistons, whereby the total action of the two pistons may be varied between the sum of the individual actions and their difference in order to determine the lower limit of the pressure fluctuations.

5. A device for carrying out fatigue tests with changing loads, comprising a testing machine operated by pressure liquid and having a pressure cylinder, two cylinders filled with liquid, an open connection between said cylinders and the pressure cylinder of the testing machine, pistons reciprocable in said cylinders for generating pressure fluctuations in the cylinder of the testing machine, a crank gear for operating said pistons, a blow-off for determining the upper limit of said pressure fluctuations, one of said cylinders being stationary and the other adapted to swivel about the axis of said crank gear, means to effect an angular displacement of the movable cylinder relatively to the stationary cylinder for effecting a phase-displacement between the two pistons, whereby the total action of the two pistons may be varied between the sum of the individual actions and their difference in order to determine the lower limit of the pressure fluctuations, and an auxiliary pump for continuously forcing a quantity of pressure liquid into the pressure cylinder for replacing the liquid lost by leakage and required in the pressure cylinder for compensating permanent deformations of the test piece.

In testimony whereof I affix my signature.

ALFRED AMSLER.